United States Patent [19]
Griffin, III et al.

[11] Patent Number: 5,916,297
[45] Date of Patent: Jun. 29, 1999

[54] METHOD AND APPARATUS FOR AN IMPROVED FLIGHT MANAGEMENT SYSTEM PROVIDING FOR SYNCHRONIZATION OF CONTROL DISPLAY UNITS IN AN ALTERNATE NAVIGATION MODE

[75] Inventors: John C. Griffin, III, Tacoma; Peter D. Gunn, Bellevue; James D. Hayes, Redmond, all of Wash.

[73] Assignee: The Boeing Company, Seattle, Wash.

[21] Appl. No.: 08/638,913

[22] Filed: Apr. 24, 1996

[51] Int. Cl.[6] ........................................... G06F 19/00
[52] U.S. Cl. ..................... 701/120; 701/14; 701/15; 701/301
[58] Field of Search ................... 701/14, 15, 16, 701/24, 23, 114, 120, 200, 201, 301; 371/68.1; 395/182.09; 364/551.01, 184, 130, 131, 132, 133, 134; 244/76 R, 182

[56] References Cited

U.S. PATENT DOCUMENTS

| | | | |
|---|---|---|---|
| 4,642,775 | 2/1987 | Cline et al. | 701/200 |
| 4,750,127 | 6/1988 | Leslie et al. | 701/16 |
| 4,811,230 | 3/1989 | Graham et al. | 701/16 |
| 4,843,557 | 6/1989 | Ina et al. | 701/114 |
| 5,029,778 | 7/1991 | DeLuca | 244/234 |
| 5,039,037 | 8/1991 | DeLuca | 244/234 |
| 5,132,905 | 7/1992 | Takai et al. | 701/33 |
| 5,340,061 | 8/1994 | Vaquier et al. | 244/175 |
| 5,341,498 | 8/1994 | Connor et al. | 395/600 |
| 5,398,186 | 3/1995 | Nakhla | 701/16 |
| 5,715,163 | 2/1998 | Bang et al. | 701/202 |

FOREIGN PATENT DOCUMENTS 0803787  10/1997  European Pat. Off. .

Primary Examiner—William A. Cuchlinski, Jr.
Assistant Examiner—Gertrude Arthur
Attorney, Agent, or Firm—James P. Hamley

[57] ABSTRACT

An improvement to an aircraft flight management system automatically allows changes entered into one control display unit (CDU) to be transmitted to the remaining CDU's upon failure of the onboard flight management computers. Each CDU includes memory allowing it to store the initial flight plan as being implemented by the flight management computer. Upon failure of all onboard flight management computers, detection of the failures by the CDU's initiates an alternate navigation mode. In this mode, entries made by a flight crew in one CDU are automatically transmitted to the remaining CDU's and, correspondingly, to the navigation displays, to thereby avoid redundant data entries in the remaining CDU's of a new, modified flight plan. In addition, all navigation displays are automatically caused to display the new, desired flight plan.

6 Claims, 6 Drawing Sheets

METHOD AND APPARATUS FOR AN IMPROVED FLIGHT MANAGEMENT SYSTEM PROVIDING FOR SYNCHRONIZATION OF CONTROL DISPLAY UNITS IN AN ALTERNATE NAVIGATION MODE

BACKGROUND OF THE INVENTION

The present invention relates to the aircraft flight management system art and, in particular, to an improved flight management system which responds to failure of all flight management computer (FMC's) to link the control display units (CDU's) such that execution of a modified flight plan in one CDU is automatically transferred to the remaining CDU's.

In modern commercial aircraft, a flight crew makes flight plan entries and modifications through a Flight Management System - Control Display Unit (FMS-CDU). The FMS-CDU is an electronic module containing a keyboard on its lower face half and an electronic display on its upper face half. By keying entries into the keyboard, the flight crew can build or modify a route into the flight management computer (FMC) by typing in a series of waypoints, which route is then displayed, in text form, on the upper half of the FMS-CDU display.

An additionally provided display is a navigation (map) display. In contrast to the text display of the FMS-CDU, the navigation display graphically depicts the selected waypoints along the desired route. Thus, as the flight crew types entries into the FMS-CDU, these are then displayed graphically on the navigation display.

Current flight management computers (FMC's) on commercial aircraft provide for the construction of a variety of flight plans, consisting of point-to-point leg segments, direct segments and procedural maneuvers. The FMC provides an output of the flight plan to the navigation display map, where the flight plan is depicted graphically.

Aircraft may be provided with one or more FMC's. In the event that all onboard FMC's become inoperative, there are provisions on many aircraft for the associated Control Display Unit (CDU) to utilize its own internal memory and computing capability to operate in an "alternate navigation" or "CDU navigation" mode. In the alternate navigation mode, the CDU stores in its own internal memory the original, or initial flight plan which resided within the FMC just prior to FMC failure. Now, in the alternate navigation mode, the CDU provides for continued display of the flight plan on its associated navigation display and provides continued capability for the flight crew to make further changes to the flight plan. In this event, each CDU is linked to its respective navigation display map.

A serious limitation with existing aircraft, however, is that in the alternate navigation mode, flight plan changes made on one CDU are not communicated to the other CDU's and, as such, the flight crew must retype all changes into the other CDU's each time a flight plan change is made so that the flight plan in all CDU's, as well as the displayed flight plan on the navigation displays are synchronized.

The burden on the flight crew to repetitively enter the same flight plan into all CDU's is burdensome and subject to the introduction of human error.

SUMMARY OF THE INVENTION

It is an object of this invention, therefore, to provide an improved aircraft flight management system which, upon detection of failure of the onboard FMC's, provides a communication link among the control display units such that execution of a modified flight plan in one CDU is automatically transferred to the remaining CDU's.

It is a particular object of the present invention to provide the above-improved flight management system wherein transmission of a modified flight plan from one CDU to all other CDU's causes a corresponding change in the navigation displays to all display the same flight plan.

Briefly, in an aircraft flight management system including at least one flight management computer (FMC) and at least two control display units (CDU's), wherein the flight crew enters an initial flight plan into the FMC and the FMC operates through an autopilot system to produce navigation guidance signals to fly the aircraft along the flight plan, an improvement allows the CDU's to detect failure of the FMC and creates a communication cross link among the CDU's such that the execution of a modified flight plan in one CDU is transmitted to all remaining CDU's. The improvement includes CDU memory for storing the initial FMC flight plan prior to FMC failure. Detection means is provided for detecting the failure of the FMC and activating all CDU's to an alternate navigation mode. Logic control associated with each CDU responds to activation of the CDU to the alternate navigation mode to:

a) permit flight crew entry into any CDU of a modified flight plan, b) permit flight crew execution of the modified flight plan, c) respond to flight crew execution of the modified flight plan to both change the current flight plan in each CDU to the modified flight plan and operate through the autopilot system to produce navigation guidance signals to fly the aircraft along the modified flight plan.

In a further aspect of the invention, the flight management system includes a plurality of navigation displays. Each navigation display is associated with one of the CDU's and produces, for review by the flight crew, a graphic depiction of the flight plan entered in its associated CDU. The logic control includes means responsive to the changing of the current flight plan in each CDU to the modified flight plan to correspondingly change the navigation displays such that each display the modified flight plan.

DETAILED DESCRIPTION

Figure 1:
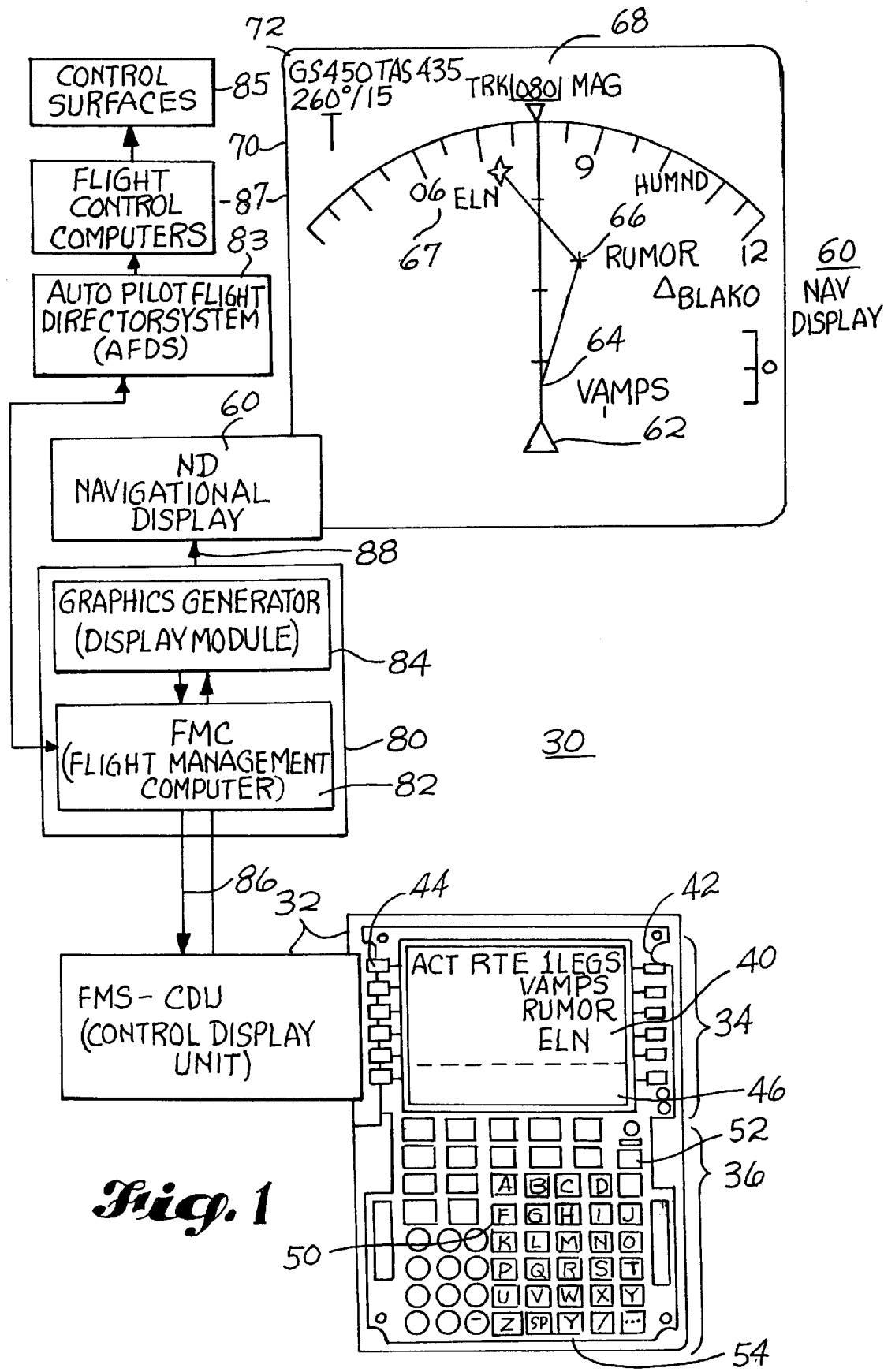
FIG. 1 is a diagram illustrating the general appearance and relative interconnection of the flight management system including the control display unit (CDU), navigation display (MAP), and logic module in accordance with the preferred embodiment of the invention.

FIG. 1 illustrates in both graphic and block diagram form the primary components of a modem commercial flight management system, indicated generally at 30. Shown at 32 is a conventional aircraft navigational Flight Management System - Control Display Unit (FMS-CDU). The FMS-CDU 32 includes an upper face portion 34 and a lower face portion 36. In its upper face portion 34, the FMS-CDU 32 includes an electronic display 40 which is capable of displaying lines of text entered by the flight crew. These lines of text depict, typically, waypoints along the path of a desired navigational route. On both sides of, and adjacent to the electronic display 40 are line select keys, indicated generally at 42 and 44 . Upon the user activating one of the line select keys 42, 44, the adjacent line of text on the electronic display is activated to thereby allow entry, selection or deletion of text.

At the lower portion of the electronic display is a scratch pad line 46 which displays system generated messages, entries via the keyboard (described below) and data being moved from one line to another.

In the lower face half 36 of the FMS-CDU 32 is a keyboard, indicated generally at 50. The keyboard 50 includes an array of keys as well as control inputs by which the flight crew can manually enter waypoints, which then appear on the electronic display 40 as text line items. Also included are various control keys which allow the flight crew to add, modify, and delete various entries.

For example, a provided Execute key 52 is a momentary action push button which becomes illuminated to indicate a modification to the active route. Upon the flight crew pushing the Execute key 52, a desired modification is activated and illumination of the key is extinguished.

A provided Delete key 54 is a momentary action switch which, when activated by the flight crew, enters DELETE in the scratch pad portion 46 of the electronic display 40. When the scratch pad is blank, a selection of a subsequent line by the line select keys 42, 44 deletes data on the corresponding adjacent line if such information is deletable.

Thus, by way of typed entries via the keypad 50, the flight crew enters waypoints along the desired navigational route. These waypoints are displayed as lines of text on the electronic display 40.

Also provided as a display to the flight crew of the desired navigational route is a navigation display (MAP) 60. The navigation display 60 depicts the current position of the aircraft, herein indicated by the triangle 62, at selected waypoints along the desired route such as the indicated waypoint "VAMPS" at 64, the next selected waypoint "RUMOR" at 66 and the final waypoint "ELN" at 67.

In addition to the route information, also depicted on the navigation display 60 is the current magnetic track 68 and an arcuate line 70 which depicts a portion of a compass rose.

Also depicted in the upper left hand corner of the display 60 is information indicating the current ground speed, true air speed, wind speed and wind direction information, collectively shown at 72.

The navigation display 60 and FMS-CDU 32 interconnect through a logic module indicated generally at 80. The logic module 80 includes the flight management computer (FMC) 82. In addition, the logic includes the graphics generator (display module) 84. Inputs from the logic module 80 to and from the FMS-CDU 32 are carried along a two-way bus 86, whereas display information from the graphics generator 84 is carried to the navigation display 60 via a one-way bus 88.

The flight management computer 82 provides lateral (LNAV) and vertical (VNAV) guidance signals to the autopilot flight director system (AFDS) 83, which validates and acknowledges the guidance signals. The AFDS 83 then provides guidance signals to the Flight Control Computer (FCC) 87 which activates the aircraft's control surfaces 85 in the normal manner such that the aircraft is directed to automatically fly the route as selected by the flight management computer 62.

Figure 2:
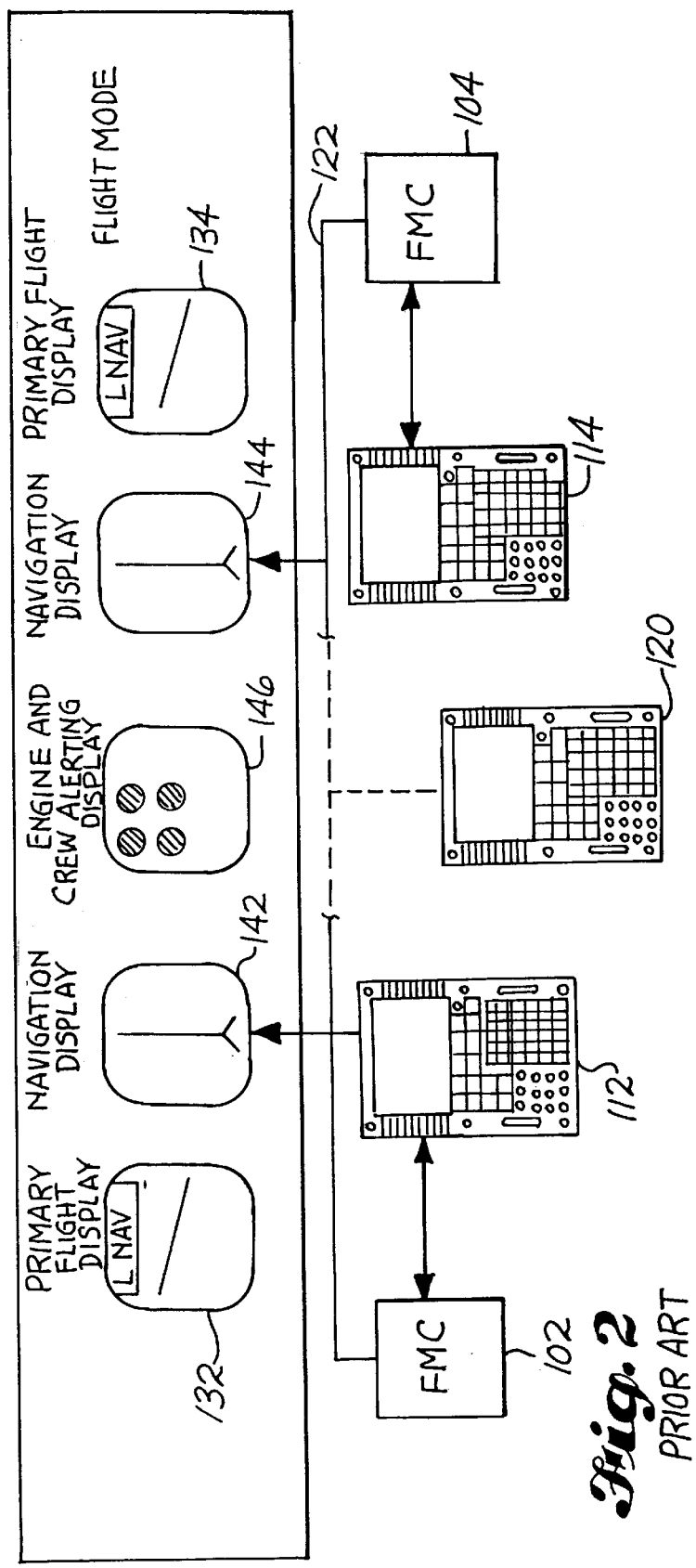
FIG. 2 depicts the main instrument panel, flight management computers (FMC's) and CDU's as found in a typical, prior art, navigation system.

FIG. 2 illustrates a typical navigation arrangement as found in a modem commercial aircraft Here, left and right flight management computers (FMC's) 102, 104, respectively, communicate with associated left and right control display units (CDU's) 112, 114, respectively. As is often provided in modem commercial aircraft, a third, redundancy center channel CDU 120 is also provided.

The CDU's 112, 114 and 120 and FMC's 102, 104 communicate over a common bus 122 to a main instrument panel indicated generally at 130. The main instrument panel includes left and right primary flight displays 132, 134, respectively and left and right navigation displays 142, 144, respectively. Also provided is a central engine and crew alerting display 146. In the manner described with respect to FIG. 1, flight crew entries into the left and right CDU's 112, 114 of desired flight plans are then transferred to the FMC's 102, 104 with corresponding graphical depictions of the flight plans being set forth on the left and right navigation displays 142, 144.

Figure 3:
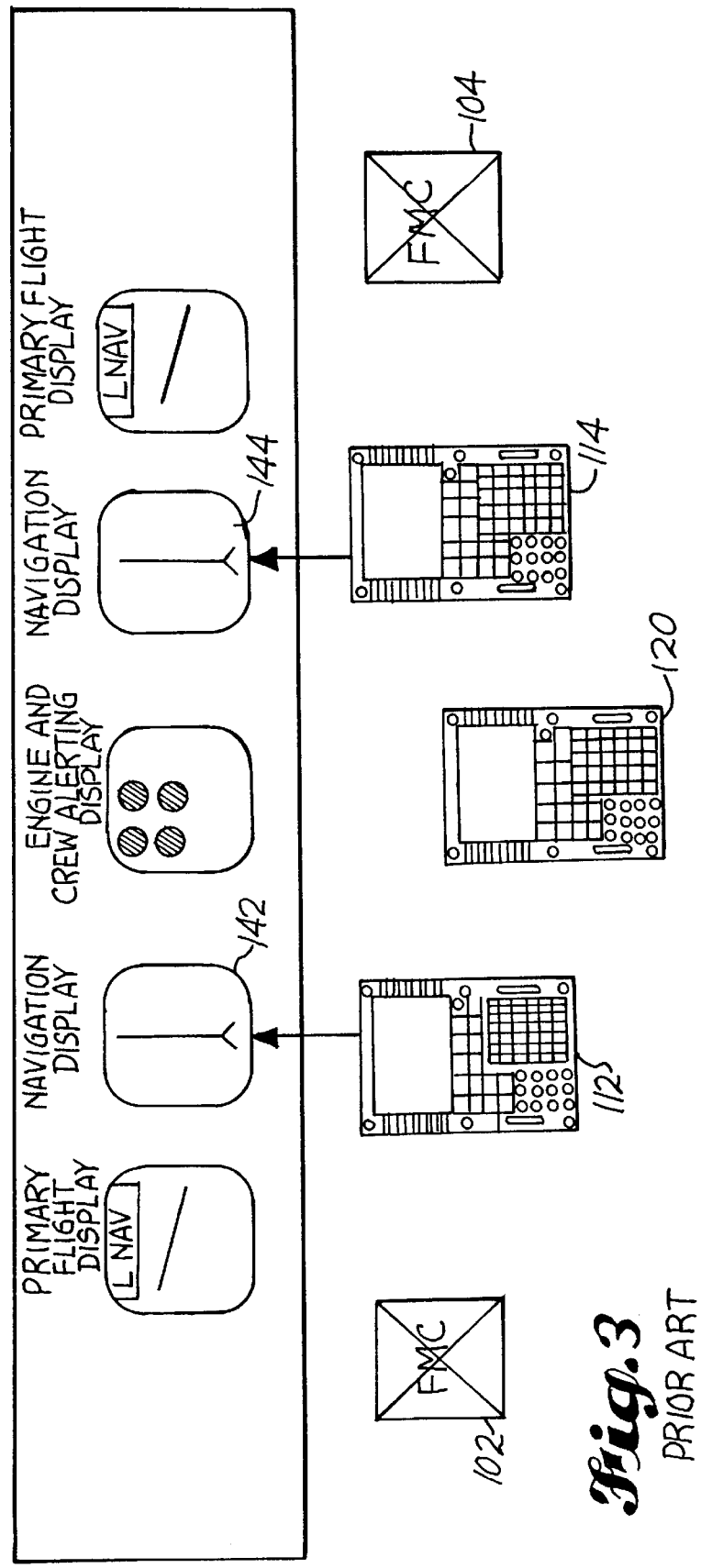
FIG. 3 illustrates the interrelationship among the main instrument panel, FMC's and CDU's in the prior art navigation system wherein the FMC's have failed.

FIG. 3 depicts a rearrangement of the interconnection of elements as shown in FIG. 2 in the event that both of the FMC's 102, 104 fail. Each CDU 112, 114 and 120 is provided with sufficient internal memory and logic capability such that flight plans may nonetheless be modified and executed by the flight management system. In particular, the pilot, via the left CDU 112, may enter modifications to the original flight plan being executed by the FMC's 102, 104 prior to their failure. Execution of the modified flight plan in left CDU 112 creates a corresponding change to the graphic display in the left navigation display 142. However, in this, the prior art configuration of the navigation components, a modified flight plan entry into CDU 112 is not reflected in CDU 114, or its corresponding right navigation display 144 or into center CDU 120. Thus, in order to make the left and right CDU's 112, 114 and the left and right navigation displays 142 and 144 agree, the newly modified flight plan as entered into CDU 112 must also be manually entered into right CDU 114 and center CDU 120. This creates, therefore, a bothersome chore for the flight crew and is subject to human entry errors.

Figure 4:
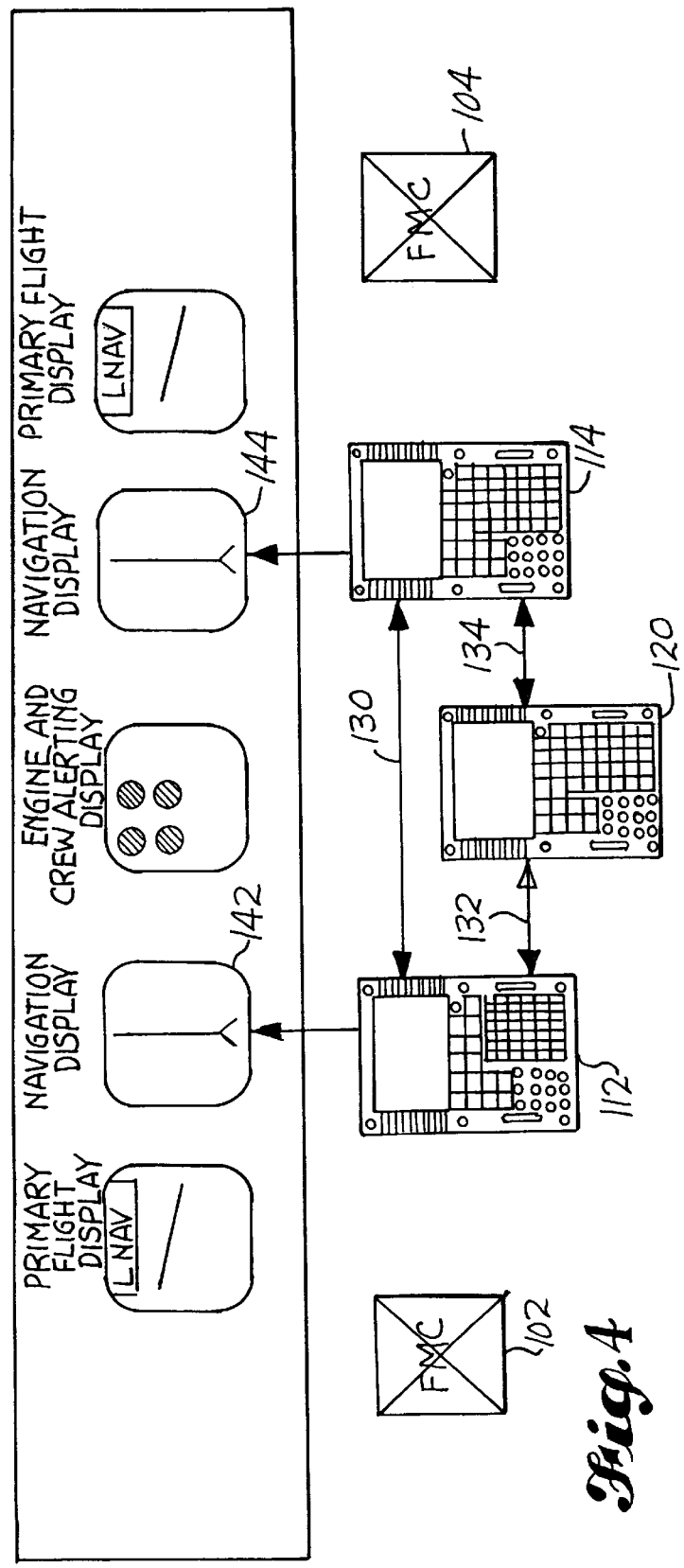
FIG. 4 depicts the interrelationship of the main instrument panel, FMC's and CDU's in accordance with the alternate navigation mode CDU linking system in accordance with the present invention.

FIG. 4 graphically depicts the arrangement of the navigation components in the alternate navigation mode according to the present invention. Here, as with FIG. 3, both the left and right FMC's 102, 104 have failed. Now, as before, the flight crew may modify the initial flight plan being executed by the FMC's 102, 104 via any of the CDU's 112, 114 or 120. The significant difference, however, between the arrangement according to the present invention as depicted in FIG. 4, and the prior art system of FIG. 3 is that interlinking communication channels 130, 132 and 134 are created between the left and right CDU's 112, 114, the left and center CDU's 112, 120 and the center and right CDU's 120, 114, respectively. By means of the interconnecting communication channels 130, 132 and 134, a modified flight plan entered into one CDU, such as CDU 112 and then executed by the flight crew is automatically transmitted to the center CDU 120 and the right CDU 114 for corresponding change in their flight plans to the new, modified flight plan. In addition, the right navigation display 144 is thereby changed to reflect the same, new modified flight plan as depicted in the left navigation display 142.

Thus, changes into one CDU automatically create corresponding changes to the remaining CDU's and all navigation displays are caused to display the same desired flight plan.

Figure 5:
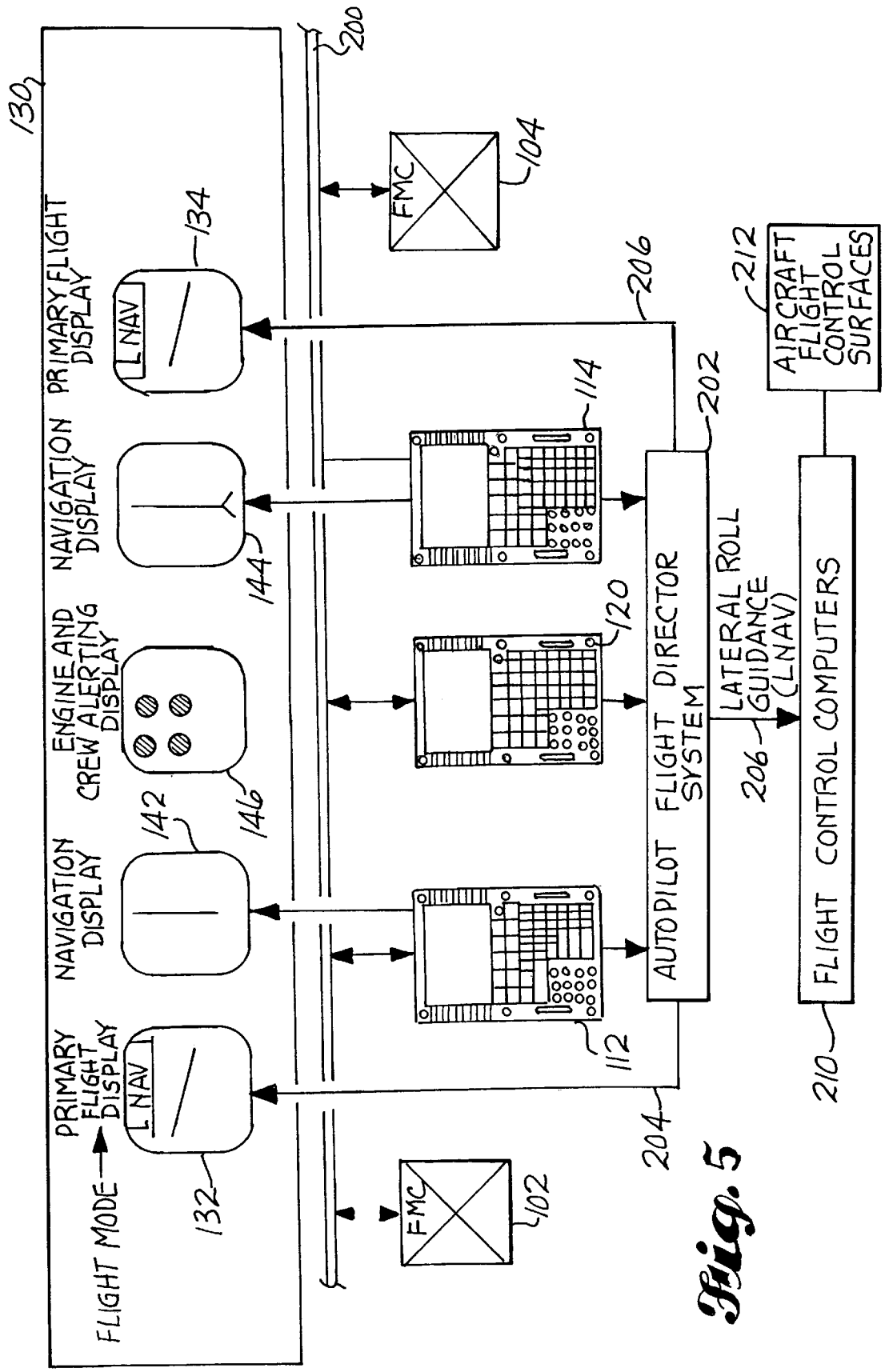
FIG. 5 is a detailed block diagram illustrating the preferred embodiment of the navigation system according to the present invention shown activated to the alternate navigation mode.

FIG. 5 is a more detailed diagram illustrating the interconnection of the navigation components according to the preferred embodiment of the invention.

Here, as before, shown are left and right flight management computers (FMC's) 102, 104. The FMC's communicate over a provided digital data bus 200 to a series of three control display units (CDU's), namely left CDU 112, right CDU 114 and center, backup CDU 120. The left and right CDU's 112, 114 also directly communicate with left and right navigation displays 142, 144, respectively which are provided on the main instrument panel 130. Located between the left and right navigation displays 142, 144 is an engine and crew alerting display 146.

The three CDU's 112, 114 and 120 also include connections to an autopilot flight director system 202. The autopilot flight director system 202 has one output line 204 which connects to the left primary flight display 136. A third output line 206 from the autopilot flight director system 202 connects to a block containing the flight control computers 210. Outputs from the flight control computers 210 are taken to the aircraft's flight control surfaces 212.

Operation of the system in FIG. 5 is shown in the alternate navigation mode, wherein FMC's 102, 104 have failed. In normal operation, the desired aircraft flight plan is loaded in the FMC's 102, 104 which then, operating through the autopilot flight director system 202 produce lateral roll guidance (LNAV) signals over line 206 provided to the flight control computers 210. The flight control computers 210 then convert the LNAV signals to corresponding outputs suitable for operating the aircraft's flight control surfaces 212 to fly the aircraft along the desired flight plan. The CDU's 112, 114 and 120 are all informed of proper operation by the left and right FMC's 102, 104 by suitable signals which are carried over the digital databus 200.

The FMC's 102, 104 produce periodic "status" bits which are transferred over the digital databus 200 to the CDU's 112, 114 and 120. In the event of the failure of an FMC 102, 104, this is detected by the CDU's 112, 114 and 120 by a corresponding change, or absence of the "status bit".

If both of the FMC's 102, 104 fail, this is detected by the CDU's 112, 114 and 120 whereby the CDU's revert to the alternate navigation mode.

In the alternate navigation mode, the flight crew may enter a modification to the initial FMC flight plan, which has been stored in internal memory provided within the CDU's 112, 114 and 120, by appropriate entries in the keyboards of the corresponding CDU's.

For example, a pilot using the left CDU 112 can modify the initial flight plan, previously being executed by the FMC's 102, 104 and stored by CDU 112 prior to FMC failure, by appropriate entry in the keyboard of left CDU 112. If the pilot desires to execute the modified flight plan, he or she hits the Execute key (FIG. 1). Upon execution of the new, modified flight plan in left CDU 112, CDU 112 transmits commands over the digital databus 200 to thereby load the new modified flight plan into the right CDU 114 and center CDU 120. In addition, upon execution of the new, modified flight plan in left CDU 112, CDU 112 communicates with navigation display 142 to display the new, modified flight plan in display 142. Similarly, upon transmission of the new, modified flight plan over digital databus 200 from left CDU 112 to right CDU 114, the right navigation display 144 is changed to reflect the new, modified flight plan and agree with left navigation display 142.

With the three CDU's 112, 114 and 120 now commanding the new, modified flight plan, commands are sent to the autopilot flight director system 102. Autopilot flight director system 102 responds by producing signals on its left and right output lines 204, 206, respectively to cause the left and right primary flight displays 132, 134 to display activation to the LNAV mode.

More significantly, however, suitable lateral roll navigation signals (LNAV) are produced by the autopilot flight director system 202 and transmitted to the flight control computers 210 over the line 206. The flight control computers 212, in the normal manner, produce output controls which are transmitted to the aircraft flight control surfaces 212 to fly the aircraft in accordance with the commanded flight path.

Thus, in accordance with the system as set forth in FIG. 5, in the alternate navigation mode wherein the flight management computers 102, 104 have failed, entry of a modified flight plan may be made into any of the CDU's 112, 114, 120 and, upon execution of the modified flight plan, all of the remaining CDU's are caused to switch to the new modified flight plan as are the corresponding navigation displays. This relieves the flight crew of redundant entry of flight path information and eliminates the possibility of the introduction of human error in such redundant entries.

Figure 6:
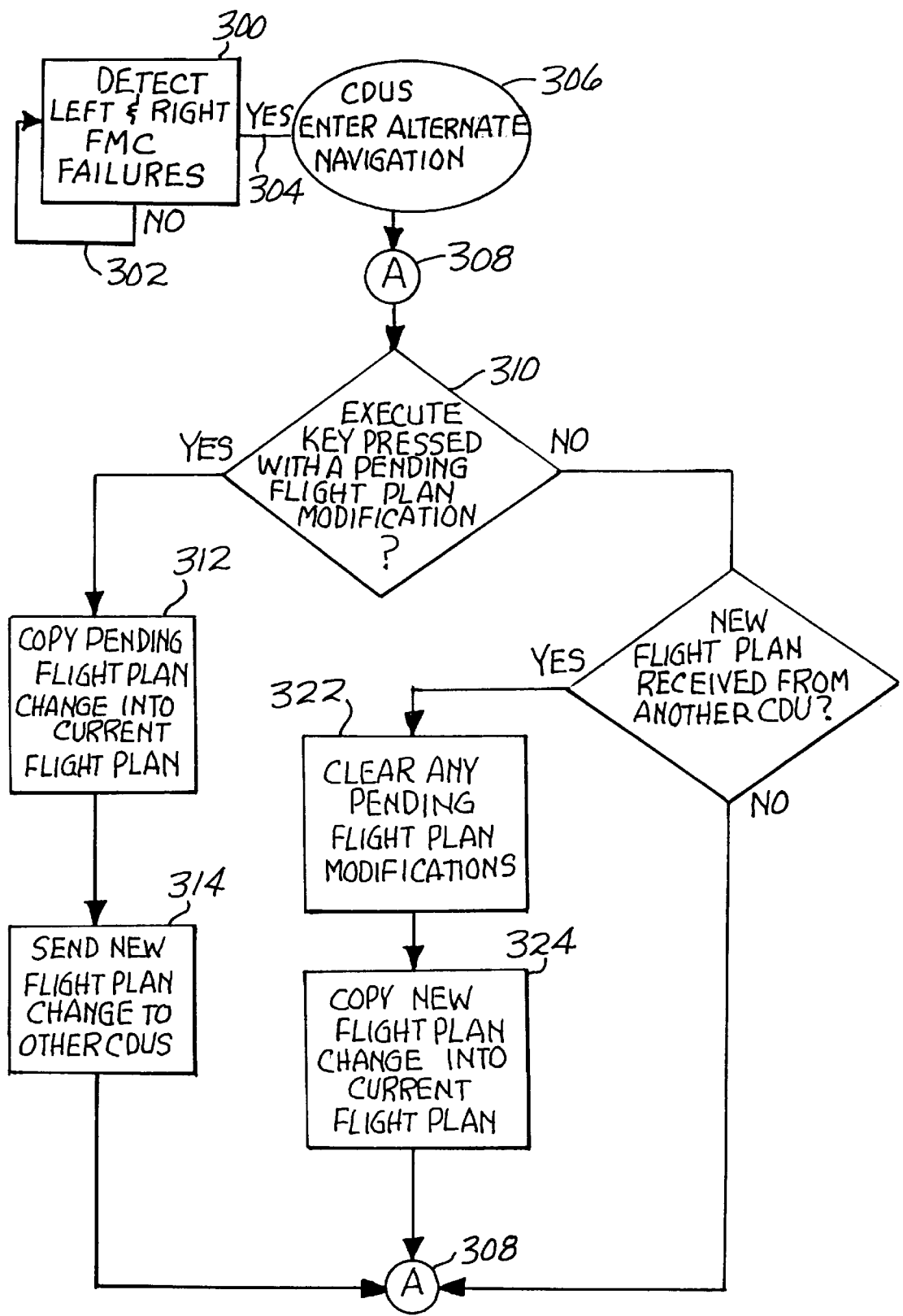
FIG. 6 is a logic flow diagram depicting the logical steps performed by the improved navigation system as shown in FIG. 5.

FIG. 6 is a logic flow diagram illustrating the logic steps performed by the improved flight control system in the alternate navigation mode. Here, beginning at block 300, the control logic determines whether or not failure of the left and right flight management computers failure has been detected. If no such failure has been detected, the system, at line 302 reverts back to the detection process.

If, however, failure of the left and right flight management computers has been detected, the system progresses, via line 304, to activate the alternate navigation mode 306. In the alternate navigation mode, the system passes through an interim position 308, labeled "A", and enters a decision point 310. At decision point 310, the system determines whether or not the execute key on the CDU has been pressed to indicate execution of a pending flight plan modification. If a new flight plan is to be executed, the system passes to block 312 and copies the pending flight plan change into the current flight plan. Then, at block 314, the system sends the new flight plan change to all of the other CDU's. Thereupon, the system then enters the interim point "A" at 308, which returns to decision point 310.

If, out of decision point 310, the system determines that there has not been an execution of a flight plan modification, it enters decision point 320. At decision point 320, the system determines whether or not a new flight plan to be executed has been received from another CDU. If no such flight plan has been received from another CDU, interim point 308 is entered. However, if a new, executed flight plan modification has been received from another CDU block 322 is entered. In block 322 any pending flight plan modifications to a CDU is cleared. Then, at block 324, the new, modified and executed flight plan is loaded into the CDU to thereby become the current flight plan. The system then responds by entering interim point 308.

In summary, a preferred embodiment of an improved flight control system has been described in detail. The improved flight control system allows control display units to detect failure of the onboard flight management computers. Upon detection of the flight management computer failures, the flight crew may enter a modified flight plan in any of the CDU's which flight plan, upon execution, is automatically transmitted to the remaining CDU's to become each CDU's active flight plan. This also creates a change in the corresponding navigation displays such that all displays display the same, newly modified flight plan.

While a preferred a embodiment of the invention has been described in detail, it should become apparent that many modifications and variations thereto are possible, all of which fall within the true spirit and scope of the invention.

we claim:

1. In an aircraft flight management system including at least one flight management computer (FMC) and at least two control display units (CDU's), wherein the flight crew enters an initial flight plan into said at least one FMC and said FMC operates through an autopilot system to produce navigation guidance signals to fly the aircraft along said flight plan, the improvement comprising:

CDU memory means for storing said initial flight plan in each CDU;

detection means for detecting failure of said at least one FMC and activating said at least two CDU's to an alternate navigation mode; and logic control means associated with said at least two CDU's responsive to activation of said CDU's to said alternate navigation mode to:
a) permit flight crew entry into any CDU of a modified flight plan,
b) permit flight crew execution of said modified flight plan;
c) respond to flight crew execution of said modified flight plan to:
i) change the current flight plan in each CDU to said modified flight plan, and
ii) operate through said autopilot system to produce navigation guidance signals to fly the aircraft along said modified flight plan.

2. The improvement of claim 1 further comprising:

a plurality of navigation displays, each navigation display being associated with one of said CDU's, each navigation display producing for flight crew review, a graphic depiction of the flight plan entered in its associated CDU, wherein said logic control means includes means responsive to said changing of the current flight plan in each CDU to said modified flight plan to correspondingly change said navigation displays to all display said modified flight plan.

3. An aircraft flight management system including:

an autopilot flight director system for producing navigation control signals to fly the aircraft along a desired route;

at least one flight management computer (FMC) operating with said autopilot flight director system to produce said navigation control signals; and at least two control display units (CDU's) which permit flight crew entry of a desired flight path plan, and further include CDU memory permitting the CDU to store the current flight plan being executed by the said FMC, said each CDU further including detection means for detecting failure of said FMC and activating said CDU to an alternate navigation mode responsive thereto, each CDU including logic control means responsive to said CDU being activated to the alternate navigation mode for:
a) permitting the flight crew to enter into said CDU a modified flight plan,
b) permitting the flight crew to execute said modified flight plan,
c) responding to said flight crew execution of said modified flight plan to:
i) change the current flight plan in each CDU to said modified flight plan, and
ii) operate through said autopilot system to produce navigation guidance signals to fly said aircraft along said modified flight plan.

4. The aircraft flight management system of claim 1 further comprising:

a plurality of navigation displays, each navigation display being associated with one of the said CDU's, each navigation display producing for flight crew review a graphic depiction of the flight plan entered into its associated CDU; and wherein said logic control means further includes means responsive to the changes of the current flight plan in each CDU to said modified flight plan to correspondingly change said navigation displays to all display said modified flight plan.

5. In an aircraft flight management system including at least one flight management computer (FMC) and at least two control display units (CDU's), wherein the flight crew enters an initial flight plan into said at least one FMC and said FMC operates through an autopilot system to produce navigation guidance signals to fly the aircraft along said flight plan, an improved method for permitting synchronization of said CDU in the event of FMC failure comprising the steps of:

a) storing said initial flight plan in each CDU;
b) detecting the instance of a failure of said at least one FMC and, responsive thereto, activating said at least two CDU's to an alternate navigation mode;
c) providing logic control means associated with said at least two CDU's responsive to activation of said CDU's to said alternate navigation mode to perform the steps of:
i) permitting the flight crew to enter into any CDU a modified flight plan,
ii) permitting the flight crew to execute said modified flight plan,
iii) responding to flight crew execution of said modified flight plan to perform the steps of:
1) changing the current flight plan in each CDU to said modified flight plan, and
2) operating through said autopilot system to produce navigation guidance signals to fly the aircraft along said modified flight plan.

6. The method of claim 5 further comprising the steps of:

providing a plurality of navigation displays, each navigation display being associated with one of said CDU's, each navigation display producing for flight crew review a graphic depiction of the flight plan entered in its associated CDU; and wherein said logic control means includes means for performing the further step of responding to the changing of the current flight plan in each CDU to said modified flight plan by changing said navigation displays such that all navigation displays display said modified flight plan.

* * * * *